JOSEPH MUSGROVE, OF EAST NEWARK, NEW JERSEY.

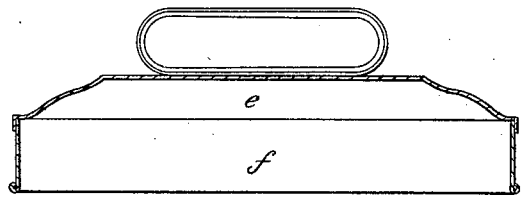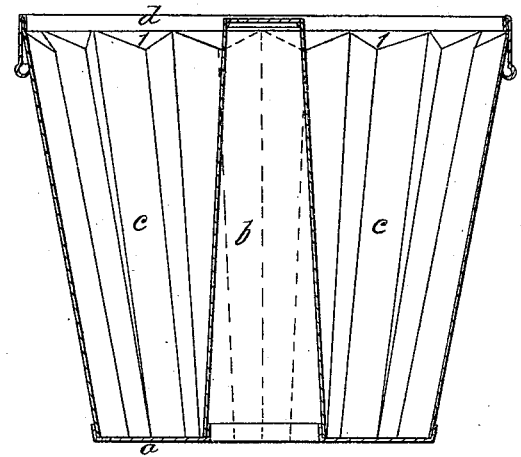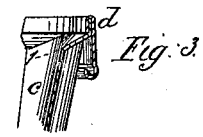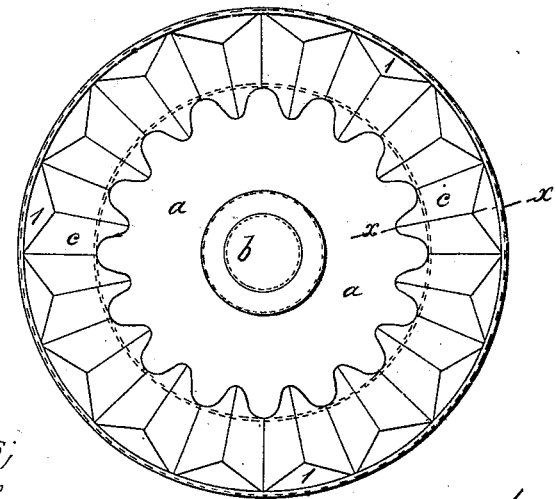

*Letters Patent No. 85,605, dated January 5, 1869; antedated December 26, 1868.*

IMPROVEMENT IN MOULDS FOR PUDDINGS.

The Schedule referred to in these Letters Patent and making part of the same.

*To all whom it may concern:*

Be it known that I, JOSEPH MUSGROVE, of East Newark, in the county of Hudson, and State of New Jersey, have invented, made, and applied to use, a certain new and useful Improvement in Moulds for Puddings, &c.; and I do hereby declare the following to be a full, clear, and exact description of the said invention, reference being had to the annexed drawing, making part of this specification, wherein—

Figure 1 is a vertical section of said mould, and its cover detached;

Figure 2 is a plan of the mould; and

Figure 3 is a detached section, at the line $xx$, through one of the corrugations.

Similar marks of reference denote the same parts.

Pudding-moulds have been made with a corrugated exterior, and the end of each corrugation has been closed by a separate piece of sheet-metal soldered into place, and extending out to the rim. This construction renders the inside of the mould irregular and rough, and necessitates considerable labor in soldering in the separate pieces of tin.

The nature of my said invention consists in a mould for puddings, &c., formed of sheet-metal, with the ends of the corrugations in the casing closed, by bending down the sheet-metal of the corrugation, so that it extends to and is united with the surrounding rim.

By this construction, the separate end-pieces to the corrugations are dispensed with, the mould is made much stronger, and less liable to be injured in use, and the cost is lessened, in consequence of the mould requiring less work upon it.

In the drawing—

$a$ is the bottom-piece of the mould.

$b$ is a central tube, introduced to facilitate the cooking of the interior of the pudding, by allowing heat more free access.

$c\ c$ are the corrugations of the exterior or casing.

The sheet-metal composing this corrugated casing is pressed or folded down, so as to close the end of said corrugation, by extending from the edge thereof to the rim $d$, as seen at 1 1, figs. 2 and 3. This stiffens and strengthens the upper part of the mould, and makes a better article, at a less cost, than heretofore.

The cover $e$, with its rim $f$, is made as usual.

What I claim, and desire to secure by Letters Patent, is—

The mould, with the end-pieces 1 of the corrugated casing $c$, formed of the sheet-metal bent down and extended to the rim $d$, as and for the purposes set forth.

In witness whereof, I have hereunto set my signature, this 18th day of May, A. D. 1868.

JOSEPH MUSGROVE.

Witnesses:
CHAS. H. SMITH,
GEO. T. PINCKNEY.